(12) United States Patent
Becker

(10) Patent No.: US 11,655,704 B2
(45) Date of Patent: May 23, 2023

(54) ACOUSTIC DATA COLLECTION METHODS AND APPARATUS FOR HYDROCARBON PRODUCING WELLS

(71) Applicant: Dieter J. Becker, Wichita Falls, TX (US)

(72) Inventor: Dieter J. Becker, Wichita Falls, TX (US)

(73) Assignee: ECHOMETER COMPANY, Wichita Falls, TX (US)

( * ) Notice: Subject to any disclaimer, the term of this patent is extended or adjusted under 35 U.S.C. 154(b) by 348 days.

(21) Appl. No.: 16/827,071

(22) Filed: Mar. 23, 2020

(65) Prior Publication Data

US 2021/0293134 A1 Sep. 23, 2021

(51) Int. Cl.
*E21B 47/047* (2012.01)
*G01V 1/137* (2006.01)
*G01V 1/46* (2006.01)

(52) U.S. Cl.
CPC ............ *E21B 47/047* (2020.05); *G01V 1/137* (2013.01); *G01V 1/46* (2013.01)

(58) Field of Classification Search
None
See application file for complete search history.

(56) References Cited

U.S. PATENT DOCUMENTS

| | | | |
|---|---|---|---|
| 4,408,676 A | 10/1983 | McCoy | |
| 4,633,954 A * | 1/1987 | Dixon | E21B 34/16 166/263 |
| 4,793,178 A * | 12/1988 | Ahern | G01S 15/88 73/152.58 |
| 4,934,186 A | 6/1990 | McCoy | |
| 5,117,399 A | 5/1992 | McCoy et al. | |
| 5,200,894 A | 4/1993 | McCoy et al. | |
| 6,634,426 B2 * | 10/2003 | McCoy | E21B 43/121 137/487 |
| 7,028,985 B2 | 4/2006 | LaVergne, Jr. | |
| 8,146,657 B1 * | 4/2012 | Gibbs | E21B 47/10 73/152.55 |
| 9,574,442 B1 * | 2/2017 | McCoy | E21B 49/00 |

* cited by examiner

*Primary Examiner* — Curtis A Kuntz
*Assistant Examiner* — Jerold B Murphy
(74) *Attorney, Agent, or Firm* — Dale B. Nixon

(57) ABSTRACT

Acoustic data can be collected from oil wells having various configurations of tubing and casing and under various operational conditions such as pumping, shut-in, and transition phases such as pressure build up. The acoustic data is collected by a microphone in response to the generation of an acoustic pulse that is transmitted into the well. There is typically substantial noise in the well pipes and this noise can degrade the quality of the reflected data recorded from the acoustic pulse. Much of this noise is produced by the flow of gas in the tubing and associated flow lines. Apparatus for use with the well can be configured to control the state of certain valves which can lead to a reduction of the noise received for the microphone that records the acoustic data.

1 Claim, 3 Drawing Sheets

ACOUSTIC DATA COLLECTION METHODS AND APPARATUS FOR HYDROCARBON PRODUCING WELLS

BACKGROUND

1. Field of the Invention

The present invention relates to the collection of acoustic data from wells, including hydrocarbon producing wells, and for the testing of such wells, wherein the hydrocarbons can be gas and/or liquids.

2. Description of the Related Art

Acoustic equipment has been used to generate pulses of increased or decreased pressure that are directed into a well to produce reflections when the transmitted pulses encounter obstructions or openings. These reflections are received and can be used to determine parameters or characteristics of the wells, for example, such as measuring the depth to a liquid-gas interface.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
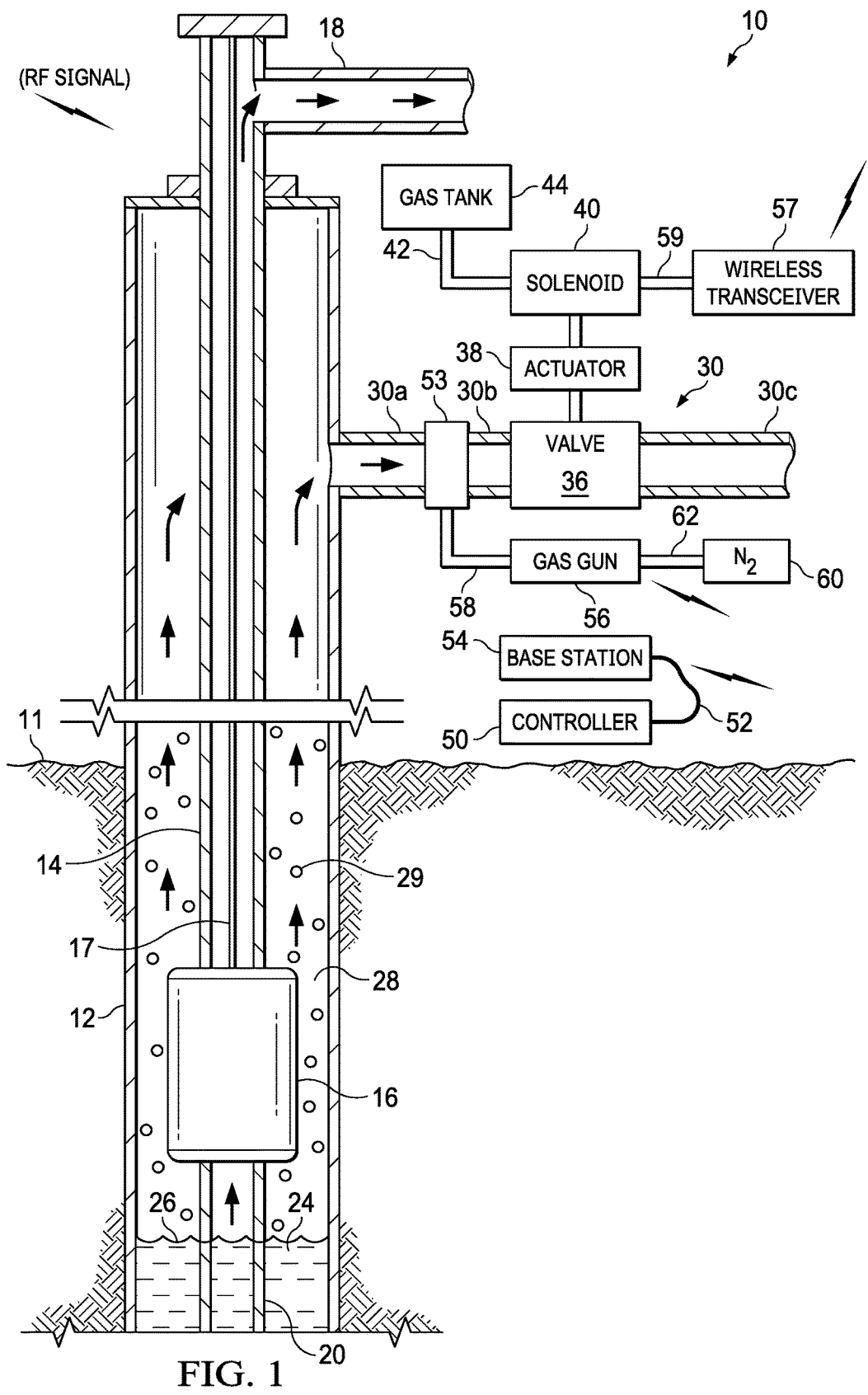
FIG. 1 is an elevation view of a well with installed tubing, casing and pump, together with liquid and gas flow lines for removing liquid and gas from the well.

Apparatus for implementing an embodiment of the present invention is shown in FIG. 1. A well 10 has a casing 12 with tubing 14 installed therein. A portion of the well 10 is above an earth surface 11. A pump 16 is mounted to the tubing 14 for lifting well fluids up the well to a liquid flow line 18. A rod 17 supports the pump 16. A tubing line 20 extends down from the pump 16 to well fluid 24 which defines a liquid surface 26, which may be located below the pump 16 as shown, or above the pump 16. Rod 17 reciprocates to lift well fluid 24 to the liquid flow line 18 by operation of the pump 16.

An annulus 28 is located between the casing 12 and tubing 14. Gas that has entered the casing 12 from a surrounding formation or separated from the well fluid 24 travels up the annulus 28 as a gas flow 29 and exits the well through a gas flow line 30 having sections 30a, 30b and 30c. A tee 53 is coupled to the flow line between flow line sections 30a and 30b and to a piping 58.

The gas flow line 30 is fitted with a valve 36 between flow line sections 30b and 30c. Valve 36 controls the flow of gas through the flow line 30. The valve 36, when open, allows gas to flow freely through the line 30 or it can be closed to completely block the flow of gas through the line 30. The valve 36 is operated by an actuator 38 which is driven by gas received from a gas solenoid 40. The solenoid 40 has a gas line 42 coupled to a gas tank 44, which contains a pressurized gas, for example, nitrogen. An electronic controller 50 is connected via a cable 52 to a base station 54 which has a radio frequency (RF) communication system, for example, WiFi.

The controller 50 can send control signals through the cable 52 to operate multiple devices in the system. The controller 50 can send a signal to the base station 54 and then base station 54 sends a wireless signal to a wireless transmitter/receiver 57 and via a cable 59 to the solenoid 40 to allow gas from tank 44 to pass through line 42 to actuator 38 which in turn causes valve 36 to close. When the controller 50 deactivates the solenoid 40, the gas pressure is removed from actuator 38 and the valve 36 is opened. The valve 36 has a normally open configuration.

The controller 50 can be a laptop computer with I/O lines, a custom microprocessor control unit with timing and data storage or a remote monitor such as the Echometer Remote Asset Monitor (RAM).

A representative model for the pneumatically operated valve 36 and related actuator 38 and the solenoid 40 is a Kimray, Inc. Model EAI 1400 SMP PO 1/2 IV High Pressure Control Valve. Kimray, Inc. Corporate Office, 52 NW 42nd Street, Oklahoma City, Okla. 73118.

The base station 54 can communicate with a wireless enabled gas gun 56 which is, for example, an Echometer Company Remote Fire Gas Gun. The base station 54 can further communicate with the wireless transceiver 57 which is connected via cable 59 to the solenoid 40. The controller 50 can transmit commands via cable 52 to the base station 54 which communicates via wireless transmission to gas gun 56 and to the transceiver 57 connected to solenoid 40.

The gas gun 56 is coupled to a compressed nitrogen tank 60 which supplies compressed nitrogen gas via a line 62 to gun 56. The gas gun 56 is coupled through piping 58 to the tee 53. The gun 56 utilizes the compressed nitrogen gas to produce acoustic pulses which are transmitted into the annulus 28 of the well 10.

The unit comprising the valve 36, actuator 38 and solenoid 40 has a normally open state and only closes when pressurized gas is applied via line 42, but the valve 36 returns to the normally open state when the pressurized gas is vented.

As an alternative, the gas tank 44 can be replaced with a connection to the flow line 30, if the gas in the flow line has sufficient pressure, for operating the actuator 38. In this case, the pressurized gas from the well is used to operate the actuator 38.

The gas gun 56 is an acoustic pulse generator which includes a microphone for receiving acoustic signals, including reflections from generated acoustic pulses. The gas gun 56 is coupled by the piping 58 to one branch of tee 53 connected between the flow line sections 30a and 30b such that the gas gun 56 is acoustically coupled to the interior of the flow line 30 and to the annulus 28 of the well 10.

The gas gun 56 generates acoustic pulses as directed by the controller 50. The generated acoustic pulses are transmitted through the gas in the piping 58 and tee 53 to the interior of the flow line section 30a and from flow line section 30a to the annulus 28. If the valve 36 is open, the acoustic pulse is also transmitted down the flow line section 30c away from the well 10 where it can strike obstructions and generate unwanted reflections. If the valve 36 is closed, the acoustic pulse is not transmitted down the flow line section 30c on the downstream side of the valve 36 from the well 10. The gas gun 56 includes a microphone which records the transmitted acoustic pulse and then records sounds, including reflection sounds (acoustic data) that return through the piping 58 to the gas gun 56. This includes reflections from the transmitted pulse and other sounds present in the well. The acoustic pulse travels down the annulus 28 and strikes the liquid surface 26 which produces a reflection that travels back up the annulus 28, through the entrance to the flow line section 30a, and through the piping 58 to the microphone in the gas gun 56.

Figure 2:
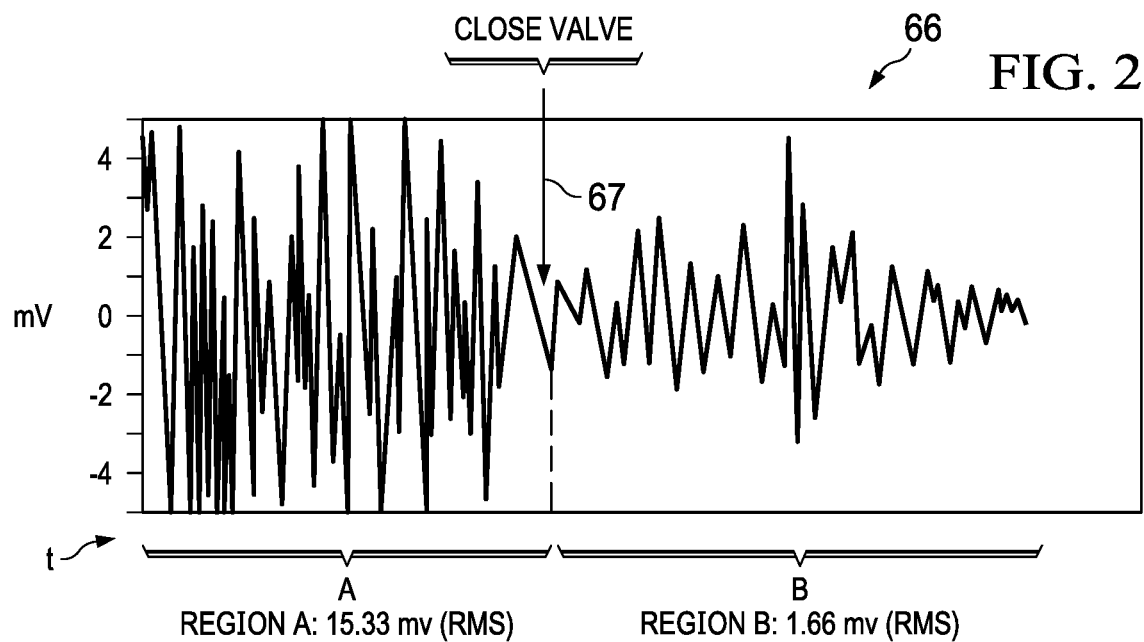
FIG. 2 is a waveform chart illustrating a comparison of the acoustic background noise received by the gas gun microphone when the flow line valve is open and when the flow line valve is closed.

The environment within the casing 12 and flow line 30 has naturally occurring background acoustic noise. This noise is primarily produced by the movement of gas through the flow conduits. The noise is received by the microphone in the gas gun 56. This noise can interfere with identifying the desired acoustic signals, for example, liquid surface reflections from the shot. A recording of the noise as a function of time is shown by waveform 66 in FIG. 2. In the absence of generating any acoustic pulses by the gas gun 56, and with the flow line valve 36 open, as shown in Region A of waveform 66, the noise has a peak to peak average amplitude, in this case 15.33 my RMS. The valve 36 is closed at the time indicated by vertical line 67. As shown in Region B of chart 66, with the flow line valve 36 closed, the amplitude of the noise received by the gas gun 56 microphone is substantially reduced to an average peak to peak of 1.66 my RMS. The noise amplitude in Region B is lower than that in Region A because the noise generated in the flow line 30 (section 30c) downstream from the valve 36 is blocked from reaching the microphone in the gas gun 56 by the closed valve 36.

Figure 3:
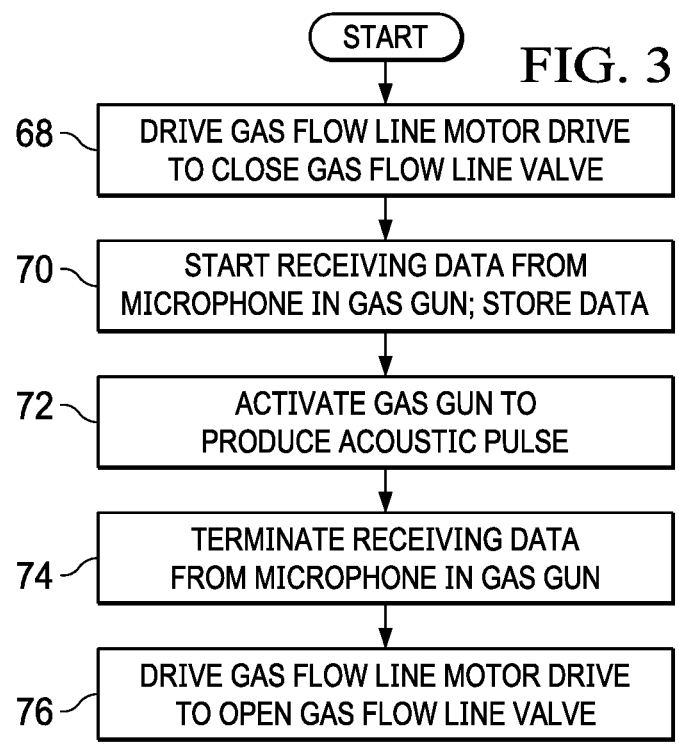
FIG. 3 is a sequence of logical steps for operating the equipment described in FIGS. 1 and 3 for collecting acoustic data from a well.

Referring now to FIG. 3, there is shown a step-by-step operation of the present invention as illustrated by the apparatus in FIG. 1. In the initial state, the valve 36 is open and the well 10 can be operating normally for producing gas and/or liquids. Alternatively, the well can be shut down with no production. In some cases, the operation of the pump 16 will be stopped while the following acoustic measurements are made. When the controller 50 begins the data collection operation, upon command or in response to a timer, the first step 68 is performed. The controller 50 transmits a command, via base station 54, to drive the flow line valve 36 to the closed position.

In step 70, the controller 50 receives data from the microphone in the gas gun 56 and records this data. The data is transmitted via wireless connection from the gas gun 56 to the base station 54 and then to the controller 50. The actual recording of data can begin before the acoustic pulse is generated, as described, or when it is generated or at a set time after it is generated.

Next, in step 72, the controller 50, via base station 54, activates the gas gun 56 to cause the gas gun to produce an acoustic pulse. This pulse is transmitted through the gas in the piping 58 to the section of the flow line between the casing 12 and the valve 36, through the flow line 30 and then into the annulus 28 of the well 10. The acoustic pulse is transmitted down the gas inside annulus 28 where reflections are produced whenever any obstruction, such as a tubing collar, or change in travel path area is encountered. This can include a reflection from the liquid surface 26.

In step 74, the controller 50 terminates the receiving and recording of data from the microphone in the gas gun 56. This termination can be after a pre-set time or upon receiving a manual or programmed input to stop recording.

After data recording has continued for a period or time, or after data recording has been terminated, the controller 50, in step 76, transmits a command via cable 52 and base station 54 to the wireless transceiver 57 and then to the solenoid 40 to drive the actuator 38 which causes the valve 36 to return to the open state. Normal gas flow can then be resumed through flow line 30.

By closing the flow line valve 36 before the gas gun generates the acoustic pulse, the energy of the pulse is blocked by valve 36 so that more acoustic energy is transmitted down the annulus 28 than if the valve 36 were in the open position.

By having the flow line valve 36 closed during the recording of return acoustic data, the noise produced in the flow line 30, from section 30c, downstream from the valve 36, is substantially reduced at the microphone of the gas gun 56, thereby improving the signal to noise ratio (SNR) of the received data. See FIG. 2 which shows less noise in time Region B when valve 36 is closed. The closed valve 36 also prevents the generated acoustic pulse from travelling down the line 30 and producing reflections when obstructions are encountered or where the line enters a storage tank. Such reflections are unwanted interfering acoustic signals. These unwanted reflections can interfere and cover up important reflection data from the well. Closing of the valve 36 prevents these unwanted reflections from being transmitted from line section 30c to piping 58 and interfering with the receiving of data by the microphone in the gas gun 56. Thus, by closing the valve 36 during acoustic data collection, there is less noise interference and the quality of the collected data is improved. This results in an improvement in the signal to noise ratio.

The operational steps described in reference to FIG. 3 can be performed by software or firmware in the controller 50.

Figure 4:
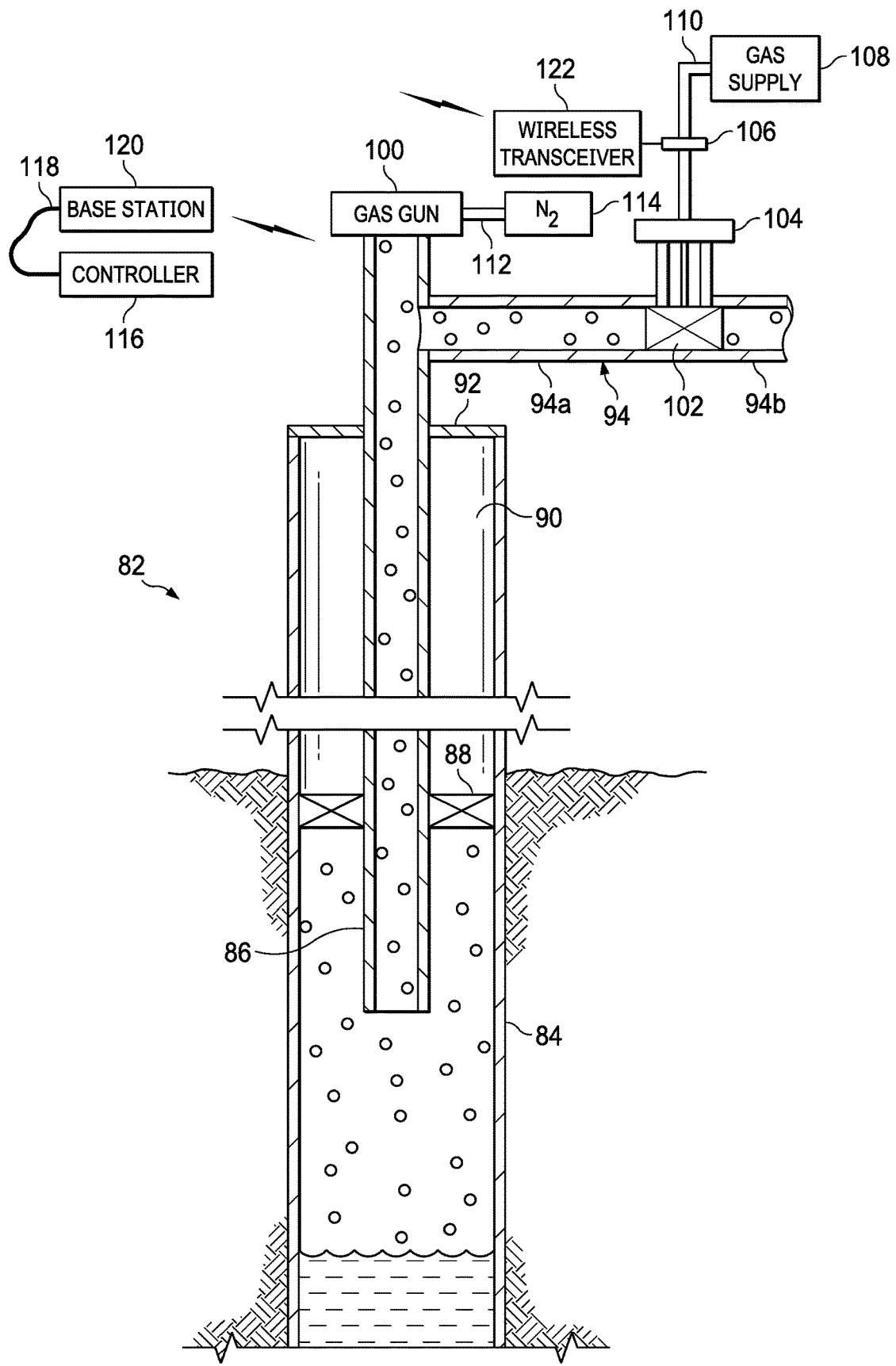
FIG. 4 is an elevation view of a gas well having a gas flow line with a flow line valve and including connected acoustic test equipment.

A further application of the present invention is described in reference to FIG. 4. This figure illustrates a well 82 which does not have a pump. This well produces gas and/or liquids by natural flow up the tubing. The well 82 has casing 84 with an installed tubing 86. A packer 88 may be installed on the tubing 86 to block any flow of well fluids up through an annulus 90. Packer 88 is optional.

The tubing 86 extends through a casing cap 92 and terminates at a gas gun 100, which corresponds to the gas gun 56 previously described. The gas gun 100 is connected through a piping 112 to a compressed gas tank 114. A flow line 94 having sections 94a and 94b connects to the tubing 86 to transport gas produced by the well 82.

A flow line valve 102 is mounted in the flow line 94 between sections 94a and 94b to regulate the flow of gas through line 94. The valve 102 is driven by an actuator 104 which is activated by a solenoid 106. A gas supply tank 108 provides compressed gas, such as nitrogen, via a line 110 to the solenoid 106.

The assembly of valve 102, actuator 104 and solenoid 106 is the same as the assembly valve 36, actuator 38 and solenoid 40 shown in FIG. 1.

A controller 116 is connected via a cable 118 to a base station 120. The base station 120 includes an RF communication system, such as WiFi. The gas gun 100 is WiFi enabled such that control and data signals can be communicated by wireless between the base station 120 and gas gun 100. The solenoid 106 is connected for control to a wireless (WiFi) transceiver 122. The base station 120, in response to control signals from the controller 116, can send commands via WiFi to the transceiver 122 to command solenoid 106 to open and to close the valve 102.

The controller 116, in one embodiment, is an assembly made up of a Remote Access Monitor (RAM). The RAM includes computer firmware, hardware, battery, and a cable that connects to the base station.

The apparatus shown in FIG. 4 operates in the same manner as described above for the apparatus in FIG. 1 with the operating steps shown in FIG. 3.

A further operational feature of the present invention is the use of the valves 36 and 102 to close off the gas flow from the well so that gas pressure build-up measurements can be made for the well.

The examples shown in FIGS. 1 and 4 describe a producing well, but the same operations can be performed for non-producing wells. The same operations can also be performed with a well, such as shown in FIG. 1, but which does not include the tubing 14. The acoustic pulse from the gas gun can be transmitted down a casing annulus (FIG. 1), tubing (FIG. 3) or casing without tubing (modified version of FIG. 1).

Although several embodiments of the invention have been illustrated in the accompanying drawings and described in the foregoing Detailed Description, it will be understood that the invention is not limited to the embodiments disclosed but is capable of numerous rearrangements, modifications and substitutions without departing from the scope of the invention.

What is claimed is:

1. A method for collecting acoustic data in a well having an installed casing with tubing therein forming an annulus between the casing and the tubing, and a gas flow line coupled to said annulus, said annulus having therein naturally occurring background acoustic noise, comprising the steps of:

reducing transmission of flow line acoustic noise from said flow line into said annulus to reduce the amplitude of the naturally occurring background acoustic noise in said annulus to thereby produce a reduced acoustic noise environment in said annulus, generating an acoustic pulse that travels through said reduced acoustic noise environment in said annulus, recording an acoustic signal in said annulus in said reduced acoustic noise environment, said acoustic signal including reflections from said acoustic pulse, and wherein a controller generates control signals for activation of each of the operations of (a) said reducing transmission of flow line acoustic noise from said flow line, (b) said generating an acoustic pulse that travels through said reduced acoustic noise environment in said annulus, and (c) said recording an acoustic signal in said annulus in said reduced acoustic noise environment.

* * * * *